United States Patent [19]

Monahan

[11] 4,022,271

[45] May 10, 1977

[54] ELECTRONIC TEMPERATURE CONTROLLER AND SWITCHING DEVICE

[76] Inventor: Brian J. Monahan, 28895 Cragmont Drive, Evergreen, Colo. 80439

[22] Filed: Nov. 26, 1975

[21] Appl. No.: 635,762

[52] U.S. Cl. .................................. 165/12; 236/47
[51] Int. Cl.² ...................................... G05D 23/32
[58] Field of Search .............. 236/46 R, 46 E, 47; 165/12; 337/304, 302; 307/141.4; 219/492; 340/309.4; 315/360

[56] References Cited
UNITED STATES PATENTS 3,964,677  6/1976  Schalow et al. ...................... 165/12

Primary Examiner—William E. Wayner
Attorney, Agent, or Firm—Wallenstein, Spangenberg, Hattis & Strampel

[57] ABSTRACT

A temperature controller switches between two different temperature levels at predetermined times of the day. At the same time of the day as the actuation of a first switch, the controller will shift from the second to the first temperature level; the actuation of a second switch at a particular time will induce a shift to the second level each succeeding day at that time. Separate timers couple to each of the switches and have 24-hour periods. At the end of their respective 24-hour periods, each timer produces an output signal and begins another period. The switches set the appropriate timer to the beginning of the period so that the changes produced by that timer occur after the expiration of each 24-hour period. The timer may take the form of a pulse counter, with counting pulses derived from the sinusoidal alternating current of the voltage source powering the system.

15 Claims, 1 Drawing Figure

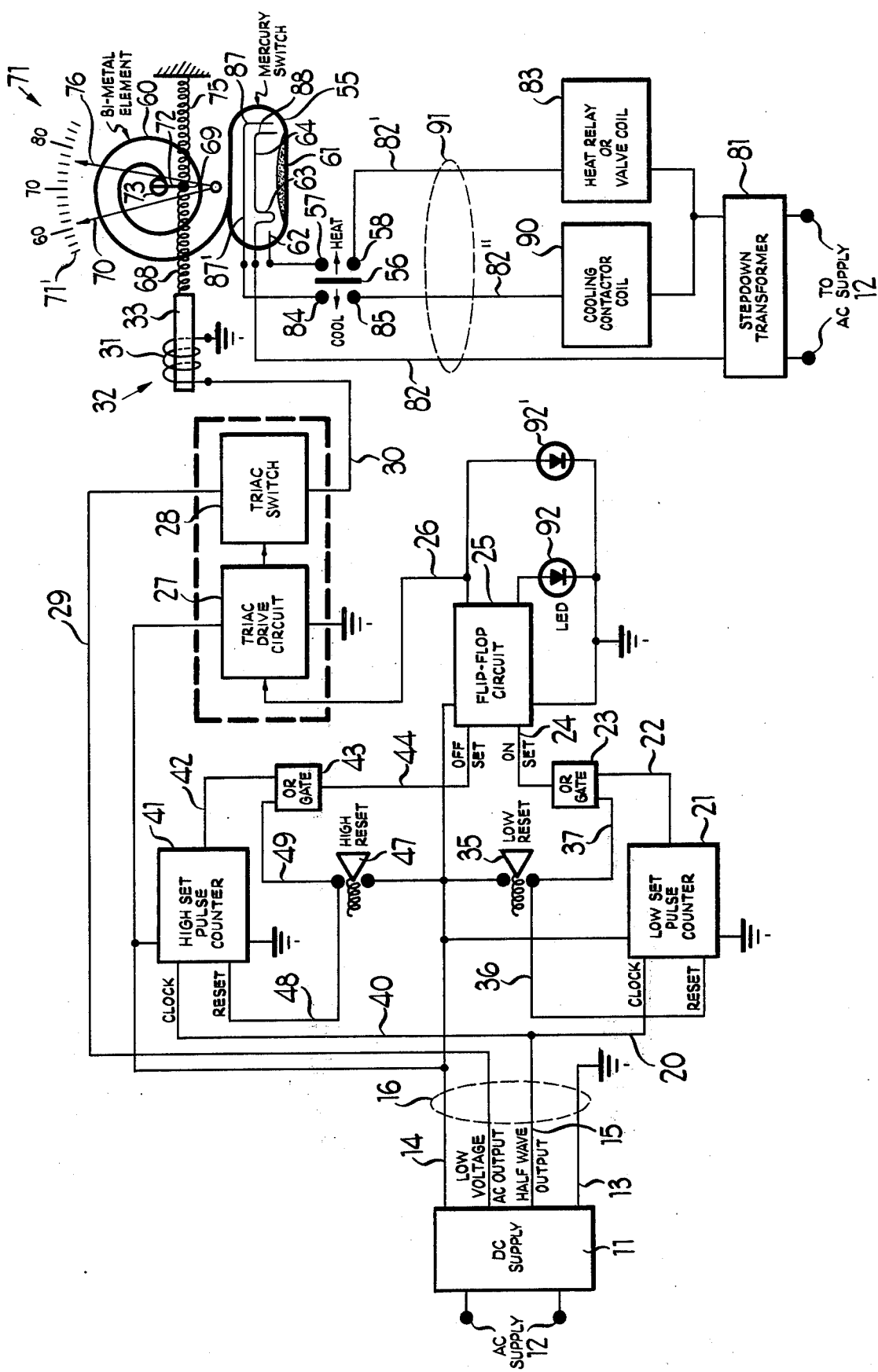

ELECTRONIC TEMPERATURE CONTROLLER AND SWITCHING DEVICE

BACKGROUND OF INVENTION

Most thermostatic controllers in a building simply establish a single temperature level for either the heating or air-conditioning unit then in operation. In a heating system, the thermostat turns-on the furnace when the temperature falls below the set level and turns it off when the temperature exceeds it. In a cooling system, the thermostat turns-off the cooling unit when the temperature falls below the set level and turns it on when the temperature exceeds it.

For ideal comfort or for energy conservation reasons, it is common to reduce the degree of cooling or heating desired during sleeping hours. This has generally required a manual change in the thermostat setting.

A recent commercial thermostat has attempted to automatically effectuate a reduction in the operation of these units at night. However, adjusting the times at which the temperature levels change requires a complicated series of manipulations of delicate parts. The first step involves accurately setting a special clock to the correct time of the day. Next, a first timer pointer is adjusted to the exact time on a dial at which the thermostat should switch to the higher temperature level. Then, a second timer pointer is adjusted to the exact time on the same dial at which the thermostat should switch to the lower temperature level. Instructions specifically point out the need for setting the pointers to the correct half of the day; this follows since "10:00" appears in both the morning and the evening. Changing the time for either occurrence, of course, involves re-setting the pointer to, hopefully, the correct position on the dial. These latter adjustments must follow the setting of the clock. Also additional pointers must be adjusted to the desired high and low temperature levels. Thus, there are a total of five mechanical adjustments needed, involving aligning pointers or the like on one or more dials with different index markings, making the entire set-up procedure a complex and tedious operation.

SUMMARY OF INVENTION

The most advantageous form of the present invention involves the adjustment of only a high and a low temperature level setting pointer on a dial with only temperature numbers marked thereon, and the momentary manual closure of two sets of timing contacts by a pair of depressible buttons (or a common toggle arm or the like moved momentarily in one direction or the other).

Timing means having high and low temperature level timer sections produces two groups of periodic output signals, each signal in each group occuring at the same time each day. The time the signals in each group occur are determined by the instant the associated timing contacts are closed. The closure of each set of contacts resets the associated timer section, which preferably is a self-resetting pulse counter, to zero or other reference count. Thus, momentarily depressing a timer button establishes one temperature level at the time involved and momentarily depressing another timer button at a different time establishes another temperature level at the time involved; the timer will always repeat the control signals after exactly 24 hours.

The manner of adjustment of the present invention to select the two different temperature levels at the desired times is, therefore, manifestly much more simple than the temperature control system discribed above.

DESCRIPTION OF DRAWING

The drawing shows a circuit schematic for a temperature controller incorporating features of the invention.

DETAILED DESCRIPTION OF DRAWING

The circuit in the drawing includes, first, a D.C. power supply 11 which connects to a source of A.C. power at 12. The supply 11 may produce a filtered D.C. voltage between a ground connecton 13 and a lead 14. The power supply 11 may also produce on a lead 15 low amplitude pulses produced by the reduction and rectification of the A.C. supply potential. Alternately, the D.C. supply 11 may also include components for forming these sinusoidal pulses into square-wave signals or preferably narrower pulses or a separate pulse-producing oscillator could be provided. Local housing codes normally allow low-voltage components to appear on a wall-mounted thermostat. The dotted circle 16 indicates a cable which leads from the D.C. power supply 11, mounted in an electrical box inside of the wall, to the thermostat on the wall.

A branch lead 20 carries the pulsed output of the D.C. supply 11 to the clock input of the low-set pulse self-resetting counter 21. The counter 21 counts the pulses on the lead 20 and produces an output pulse each 24-hour period from zero count and resets itself to zero at that time. (A "ring" pulse counter is such a self-resetting counter.) The usual A.C. power has a frequency of 60 cycles per second and where the power supply 11 produces pulses by half wave rectification, the supply produces 3,600 pulses per minute and 216,000 cycles per hour. After 24 hours the counter will accumulate a count of 5,184,000.

The output pulses from the counter 21 on the lead 22 are fed to OR gate 23. An OR gate, in general, passes input pluses appearing on any of its input leads to its output lead. Consequently, a pulse on the lead 22 passes through the OR gate 23 and along the lead 24 to an on-set input of the flip-flop or bistable circuit 25. The pulse appearing at its on-set input places an output lead 26 thereof in a first voltage state. This first voltage state causes a triac drive circuit 27 to which output lead 26 is connected to produce a sufficient drive for a triac switch 28 to drive it into a conducting state. In this state, A.C. current flows from an A.C. output terminal, which may extend from the D.C. supply 11, along a lead 29, through the triac 28, along a lead 30 to the coil 31 of a solenoid 32. This current energizes the solenoid 32, which pulls an armature 33 thereof to the left as viewed so that, as discussed below, a thermostatic controller 71 may operate at the lower of two temperature levels to which it can be set. The energization of solenoid 32 in effect sets or prepares the control system for temperature control at the set low temperature level and de-energization thereof sets or prepares the control system for the temperature control at the set high temperature level, and so carries out the function of a temperature level preparing means to which it and associated means will be referred to in the claims.

Thus, when the low-set pulse counter 21 produces an output pulse along the lead 22 once each day, the thermostatic controller operates to produce the lower of the two temperature levels to which is is set. Momentary operation of a low-reset switch 35 establishes the time of the day at which the pulse from the counter 21 will appear. The momentary closure of switch 35 momentarily establishes contact between a lead 36 and the positive voltage on the lead 14 from the D.C. supply 11. The resultant positive pulse appearing on lead 36 is fed to the reset input of the low set counter 21 and sets its count to its starting count (e.g., zero). Accordingly, the counter 21 produces its next output signal exactly 24 hours later. As a consequence, the pulses that place the thermostatic controller in a condition to produce a low temperature level will occur at the same time each day the low-reset switch 35 was operated; so, for example, pressing the switch 35 at 10:30 P.M. will switch the controller to its low temperature producing level at 10:30 P.M. on each succeeding day; only a subsequent depression of the switch 35 will change that time.

Activating the switch 35 will also immediately cause the controller to operate in its low temperature producing condition. Thus, operation of the switch 35 also produces a positive pulse on a lead 37 which is fed to the OR gate 23, which passes along the lead 24 to the on set input of flip-flop circuit 25, to set the flip-flop 25 to its first or triac turn-on state in the manner previously described.

The circuit also includes a set of components similar to those first described for causing the controller to operate in a high temperature producing condition. The positive pulses on the pulse output lead 15 of the D.C. supply 11 are fed by a lead 40 to the clock input of a self-resetting, high-set pulse counter 41. It is identical to low set pulse counter 21. After counting the number of pulses it receives in a 24-hour period, the high set pulse counter 41 produces an output pulse on a lead 42 and resets itself to zero count. An OR gate 43 passes this pulse to a lead 44 coupled to an off-set input of the flip-flop circuit 25 which sets the flip-flop circuit to its opposite state from that produced previously by the pulse fed to its on-set input. The output voltage of the flip flop 25 on the lead 26 then assumes a second or previous state, which causes the triac drive circuit 27 to turn-off the triac 28 so no current flows from the lead 29 to the lead 30 connected to the solenoid 32. As a result, the controller operates to produce the high temperature level.

The time at which the high set pulse counter produces its output control pulse is determined by the time a high reset button 47 is momentarily depressed to reset the high set pulse counter 41 to its initial zero to other starting count. Thus, momentarily depressing the high reset button 47 couples the possitive voltage on the lead 14 to a lead 48 extending to the reset input of the high set pulse counter 41 which resets the counter. This voltage pulsation also coupled by a lead 49 to an OR gate 43 which passes the pulse to lead 44 extending to the off-set input of the flip-flop circuit 25. The filp-flop circuit 25 is then operated to its second high temperature level producing state.

The controller 71 is old in the art and operates in a well known manner to be described to control the position of a mercury switch 55 which operates in conjunction with a three position selector switch 56 which is adjustable to one of three positions which determines whether the heating or air-conditioning apparatus is to be prepared for operation or whether both apparatus are rendered inoperative. (Moving the switch 56 to the extreme right as shown provides an electrical path between the contacts 57 and 58 which, in conjunction with the mercury switch 55, allows the actuation of the heating apparatus when the ambient air becomes sufficiently cold. Moving the switch 56 to the extreme left as shown provides an electrical path between the contacts 84 and 85, which, in conjunction with the mercury switch 55, allows the actuation of the cooling apparatus when the ambient air becomes sufficiently hot.)

The mercury switch is carried by a bimetalic element 60 forming part of the controller 71. This element 60 has strips of a first metal on the inside and a second metal on the outside, the inside metal having a greater thermal coefficient of expansion than that on the outside. As the temperature drops, the inner portion of the strip 60 contracts more than the outer portion, and as the temperature rises, a reverse action occurs which expands the strip. This contraction or expansion differential results in the strip assuming a tighter or looser spiral which rotates the mercury switch 55 in a counterclockwise or clockwise direction to tilt the same to varying degrees in one direction or the other. When the switch 55 has rotated sufficiently in a counterclockwise direction, the pool of mercury 61, under the action of gravity, moves to the left in the associated container to establish contact between a contact 62 and the U-shaped portion 63 of a lead 64 to energize heating apparatus if the system is to effect a heating operation. When the switch 55 has rotated sufficiently in a clockwise direction, the pool of mercury 61, under the action of gravity, moves to the right to break this contact or to bridge contacts 87 and 88 at the ends of leads 64 and 87', to energize cooling apparatus if the system is to effect a cooling operation.

The position, and thus the functioning, of the mercury switch 55 also depends upon the position of the solenoid armature 33. When the flip-flop 25 is in its first state and the triac 28 conducts to energize the solenoid, the armature 33 and the spring 68 is pulled to the left where a stud 69 on the armature spring 75 abuts against a low-temperature pointer 70 previously set at the desired low temperature along the dial 71'. As the stud 69 moves to the left, it effects a clockwise rotation, through an arm 72 of the entire bimetalic strip 69 about a pivot 73, the amount of rotation of the strip depending on the position of pointer 70. As a consequence, the mercury switch 55 also moves in a clockwise direction which requires a lower temperature to tilt the switch 55 to a point where the mercury leaves the contact 62. When the solenoid 32 is de-energized and the armature 33 is in its normal right hand position as urged by the armature spring 75, the stud 69 will abut against a high-temperature pointer 76 previously set at the desired high temperature level along the dial 71'. As the stud 69 moves to the right, it effects a counterclockwise rotation of the entire bimetalic strip 60 about the pivot 73, the amount of rotation depending upon the position of the pointer 76. As a consequence, the mercury switch 55 also moves in a counterclockwise direction which causes a higher temperature to tilt the switch 55 to a point where the mercury leaves the contact 62.

When the system is operated in a cooling mode, the cooling function occurs when the mercury 61 bridges the contacts 87 and 88. The cooling action produces a lower temperature when the solenoid 32 is energized to bring the stud 69 against the low temperature pointer 70, because then it will take a lower temperature to tilt the mercury switch 55 to a point where the mercury will leave the contact 87 than it will when the stud 69 is resting against the high temperature pointer 76 when the solenoid 32 is de-energized.

As illustrated, current for energizing the heating and cooling apparatus may be derived from A.C. supply voltage terminals 12 coupled to transformer 81 having an output terminal connected to a lead 82 connected to the mercury switch lead 64. When the mercury 61 bridges U-shaped portion 63 and contact 62, lead 82 is connectable through the switch 56 and a lead 82' of a conduit 91 which may also include the lead 82 to one terminal of a relay or solenoid valve coil 83 which when energized operates the heating apparatus being controlled. The other terminal of the relay or solenoid coil 83 is connected to the other output terminal of transformer 81 when the switch 56 is moved away from the contacts 57 and 58 or when the mercury switch 55, under the influence of either rising temperatures or the operation of solenoid 32, rotates sufficiently clockwise for the mercury 61 to lose touch with the contact 62 and U-shaped portion 63. The contact 85 associated with the selector switch 56 is connected by a lead 82'' to one terminal of a cooling contactor coil 90 or the like to activate the cooling apparatus involved when the mercury 61 bridges the contacts 87 and 88 and the switch 56 is in its left hand position. In such case, continuity between the cooling contactor coil and the step-down transformer output is established by a path including one of the output terminals of the transformer 81, the lead 82, contacts 88 and 87, contacts 84 and 85, and lead 82'', and the connection of the other terminal of the cooling contactor coil 90 to the other output terminal of the transformer 81.

Light-emitting diodes 92 and 92' are most advantageously associated with the two different outputs of flip-flop circuit 25 to indicate whether the circuit is in a triac turn-on or turn-off state. Thus, the light-emitting diode 92', which may have indicia associated therewith indicating a low temperature state of operation of the system, is connected to an output of the flip-flop circuit 25 in a manner such that it will become energized when the flip-flop circuit is in the triac turn-on state. The light-emitting diode 92, which may have indicia associated therewith indicating a high temperature state of operation of the system, is connected to an output of the flip-flop circuit 25 in a manner such that it will become energized when the flip-flop circuit is in its triac turn-off state.

The circuit may include a different quantity of timers than the two shown at 21 and 41. For example, it may include three or more to effect three or more different temperature-level changes at the chosen times. This would, of course, necessitate various modifications to the number of pointers on the dial 71' and to the switching mechanism which selects the particular temperature level in response to the circuit operation.

The present invention thus provides an extremely simplified means for controlling the time at which a controller selects two different temperature levels.

It should be understood that numerous modifications may be made in the most preferred form of the invention disclosed without deviating from the broader aspects thereof. For example, although the high and low reset switches 35 and 47 are disclosed as separate, manually operable push buttons or the like, these two switches could comprise the stationary contacts shown in the drawing associated with switches 35 and 47 and a single, spring-centered toggle arm carrying a single bridging contact and movable momentarily in one direction or the other to effect a bridging of the stationary contacts associated with the switches 35 and 47. In the claims, these various switches are sometimes generically referred to as manually operable timer control means operable to at least two different conditions (i.e., a condition, for example, where one set of stationary contacts are bridged and a condition where another set of stationary contacts are bridged).

I claim:

1. A temperature control system comprising: manually operable temperature level setting means for setting two temperature values for two temperature level control points identifying the desired temperatures at which a given environment is to be approximately maintained during different time intervals in a day; temperature responsive means which is to have a control condition when the temperature of the environment reaches the selected temperature control point; temperature level preparing means which in a first condition thereof adjusts said temperature responsive means so it assumes said given control condition when the temperature of the environment is at the selected low temperature control point and in a second condition thereof adjusts said temperature responsive means so it assumes said control condition when the temperature of the enviornment is at the selected high temperature control point; and timer means for controlling the time of operation of said temperature level preparing means to said first and second conditions thereof comprising: manually operable timer control means operable to at least two different conditions, means responsive to the particular moment when said timer control means is operated to one of said conditions for generating a first control signal every 24 hours from the moment said control member is momentarily moved to said one condition, means responsive to the particular moment when said timer control means is operated to the other condition for generating a second control signal every 24 hours from the moment said timer control means is momentarily operated to said other control condition, and signal responsive means responsive to the time of generation of said first and second control signals for respectively operating said temperature level preparing means to said first and second conditions thereof.

2. The temperature control system of claim 1, wherein said means responsive to the particular moment when said timer control means is operated to said one of said conditions includes a first self-resetting pulse counter coupled to a source of regularly occurring pulses, and, after establishing a count equal to the number of pulses produced by said source in a 24-hour period, generates said first control signal and resets itself to a reference count; said timer control means, when operated to said one of said conditions, sets said first counter to a reference count; said means responsive to the particular moment when said timer control means is operated to said other condition includes a second self-resetting pulse counter connected to said source of regularly occurring pulses and, after establishing a count equal to the number of pulses produced by said source in a 24-hour period, generates said second control signal and resets itself to a reference count; and said timer control means, when operated to said other condition, sets said second counter to a reference count.

3. The temperature control system of claim 2, wherein each of said pulse counters is an electronic pulse counter.

4. The temperature control system of claim 3, wherein said source of pulses is a source of alternating current power for said system.

5. The temperature control system of claim 4, wherein said temperature responsive means includes switch means having first and second positions, and:
   a. when said switch means is in said first position, activates a heating unit when the temperature of the environment falls to the selected temperature control point; and
   b. when said switch means is in said second position activates a cooling unit when the temperature of the environment rises to the selected temperature control point.

6. The temperature control system of claim 5, including means for indicating that said temperature level preparing means is in a predetermined one of said first and second conditions.

7. The temperature control system of claim 5, including first indicating the means for indicating that said temperature level preparing means is in said first condition and second indicating means for indicating that said temperature level preparing means is in said second condition.

8. The temperature control system of claim 7, wherein each of said first and second indicating means includes a light-emitting diode.

9. The temperature control system of claim 1, wherein said temperature level preparing means includes a set-reset type flip-flop; said means responsive to the particular moment when said timer control means is operated to said one of said conditions couples and provides said first control signal to a first input of said flip-flop; said means responsive to the particular moment when said timer control means is operated to said other condition couples and provides said second control signal to a second input of said flip-flop; the receipt of said first control signal by said first input of said flip-flop sets the output of said flip-flop to a first condition; and the receipt of said second control signal sets the output of said flip-flop to a second condition.

10. The temperature control system of claim 9, wherein said temperature level preparing means further includes a triac with the gate of said triac coupled to the output of said flip-flop such that one of said first and second conditions of said output of said flip-flop renders said triac conducting and the other of said first and second conditions of said output of said flip-flop renders said triac non-conducting.

11. The temperature control system of claim 10, wherein said temperature level preparing means further includes a solenoid coupled to said triac, said solenoid assuming a first configuration when said triac is conducting and assuming a second configuration when said triac is non-conducting.

12. A temperature control system comprising: manually operable temperature level setting means for setting two temperature values for two temperature level control points identifying the desired temperatures at which a given environment is to be approximately maintained during different time intervals in a day; temperature responsive means which is to have a control condition when the temperature of the environment reaches the selected temperature control point; temperature level preparing means which in a first condition thereof adjusts said temperature responsive means so it assumes said given control condition when the temperature of the enviornment is at the selected low temperature control point and in a second condition thereof adjusts said temperature responsive means so it assumes said control condition when the temperature of the enviornment is at the selected high temperature control point; and timer means for controlling the time of operation of said temperature level preparing means to said first and second conditions thereof comprising: bistable means settable into a first condition for operating said temperature control level preparing means to said first condition and a second condition for operating said temperature control level preparing means to said second condition, first and second self-resetting counters which reset themselves to a given reference count after a given limited count is reached so the next pulse received thereby resets the same to a reference count, a source of pulses fed to said pulse counters which cause the counters to reach said limited count every 24 hours after being reset to said reference count, means responsive to the limited or reference count in said first pulse counter for operating said bistable means to said first condition and responsive to the limited or reference count in said second pulse counter for operating said bistable means to said second condition, manually operable timer control means operable to at least two different conditions, and control means including means responsive to the limited or reference count in said first pulse counter for operating said bistable means to said first condition and responsive to the limited or reference count in said second pulse counter for operating said bistable means to said second condition, manually operable timer control means operable to at least two different conditions, and control means including means responsive to the operation of said manually operable timer control means to one of said conditions for resetting said first pulse counter, and means responsive to the operation of said manually operable timer control means to the other of said conditions for resetting said second pulse counter to said reference count.

13. The temperature control system of claim 12, wherein said bistable means includes a set-reset type flip-flop; said means responsive to the limited or reference count in one of said pulse counters includes a connection to a set input of said flip-flop; and said means responsive to the limited or reference count in the other pulse counter includes a connection to a reset input of said flip-flop.

14. The temperature control system of claim 13, wherein said temperature control level preparing means includes a triac with the gate of said triac controlled by the output of said flip-flop such that either the setting or resetting of said flip-flop renders said triac conducting and the other of said renders said triac non-conducting.

15. The temperature control system of claim 14, wherein said temperature control level preparing means further includes solenoid means coupled to said triac, said solenoid means assuming a first configuration when said triac is conducting and assuming a second configuration when said triac is non-conducting.

* * * * *